United States Patent [19]

Yrjönen et al.

[11] Patent Number: 5,039,860
[45] Date of Patent: Aug. 13, 1991

[54] APPARATUS FOR MONITORING THE RADIOACTIVITY OF A PLURALITY OF LIQUID SCINTILLATION SAMPLES DEPOSITED ON MULTI-WELL SAMPLE PLATES

[75] Inventors: Tapio Yrjönen Turku; Kauko Lehtinen, Raisio; Vesa Sonne, Turku, all of Finland

[73] Assignee: Wallac OY, Turku, Finland

[21] Appl. No.: 469,438
[22] PCT Filed: Sep. 4, 1989
[86] PCT No.: PCT/SE89/00464
§ 371 Date: Apr. 11, 1990
§ 102(e) Date: Apr. 11, 1990
[87] PCT Pub. No.: WO90/02960
PCT Pub. Date: Mar. 22, 1990

[30] Foreign Application Priority Data

Sep. 6, 1988 [SE] Sweden ........................ 8803115

[51] Int. Cl.⁵ .............................. G01T 1/204
[52] U.S. Cl. .................... 250/328; 250/364
[58] Field of Search ............ 250/328, 364, 368

[56] References Cited

U.S. PATENT DOCUMENTS 3,924,128 12/1979 Frank .................... 290/328
4,298,796 11/1981 Warner .................. 250/328

FOREIGN PATENT DOCUMENTS

82/00359 2/1982 PCT Int'l Appl. .
2167279 5/1986 United Kingdom .

OTHER PUBLICATIONS

"McGraw-Hill Dictionary of Scientific and Technical Terms", McGraw-Hill Book Co., N.Y., 1978, p. 916.

Primary Examiner—Carolyn E. Fields
Attorney, Agent, or Firm—Fred Philpitt

[57] ABSTRACT

An apparatus for counting liquid scintillation samples which includes a sample plate containing a plurality of cup-shaped sample wells, a photomultiplier assembly over the tops of said cup-shaped sample wells, a photomultiplier assembly beneath the bottoms of said cup-shaped sample wells and light reflective tubes extending upwardly from said lower photomultiplier assembly and surrounding each cup-shaped sample well.

2 Claims, 2 Drawing Sheets

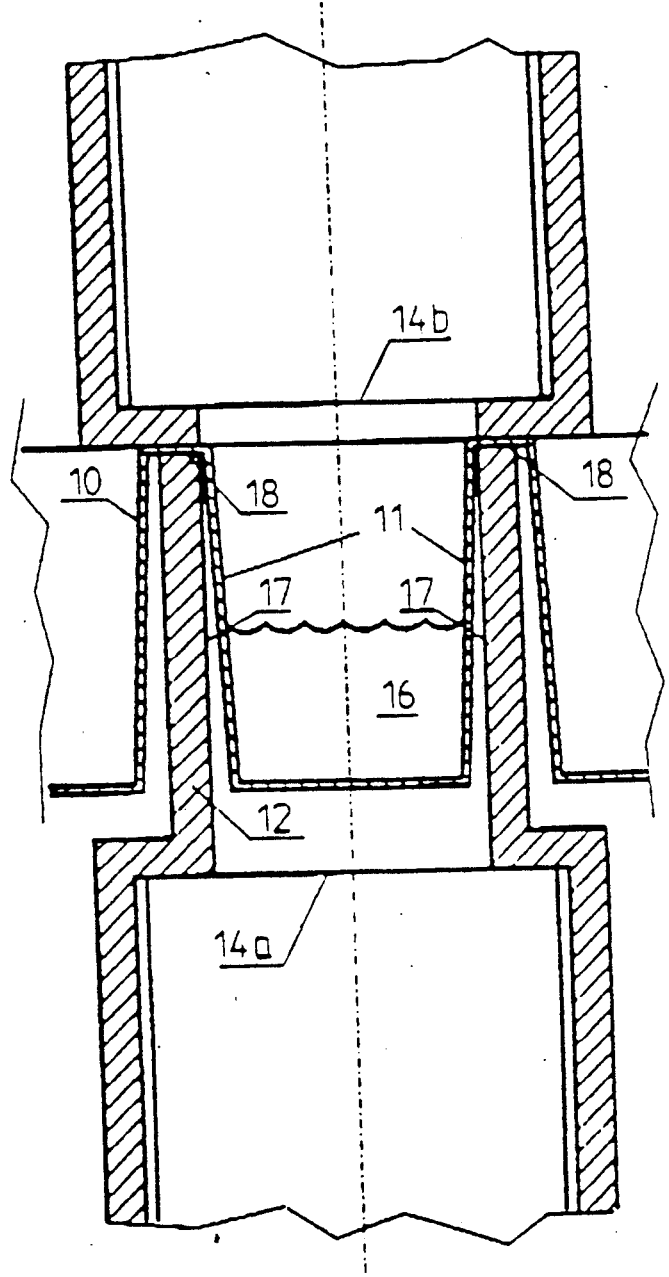

APPARATUS FOR MONITORING THE RADIOACTIVITY OF A PLURALITY OF LIQUID SCINTILLATION SAMPLES DEPOSITED ON MULTI-WELL SAMPLE PLATES

BACKGROUND OF THE INVENTION

Multi-well sample plates which comprise several separate sample wells are widely used as test plates for in vitro analysis. Said plates can be produced for example by vacuum thermoforming (deep drawing) from a transparent plastic sheet and they have for example eight rows of wells arranged in twelve columns. These plates can be used especially for preparing typically low energy beta radiation emitting liquid scintillation samples. Unfortunately, these samples must first be transferred into liquid scintillation counting vials, because existing liquid scintillation counters cannot count samples directly from this kind of multi-well sample plates.

SUMMARY OF THE INVENTION

The present invention shows a new apparatus which counts one or several liquid scintillation or corresponding samples at a time directly from the multi-well sample plates which comprise several separate sample wells.

BRIEF DESCRIPTION OF THE DRAWINGS

FIGS. 1a and 1b show vertical sections of the counting apparatus under two different conditions.

DESCRIPTION OF THE PREFERRED EMBODIMENTS

Figure 1A:
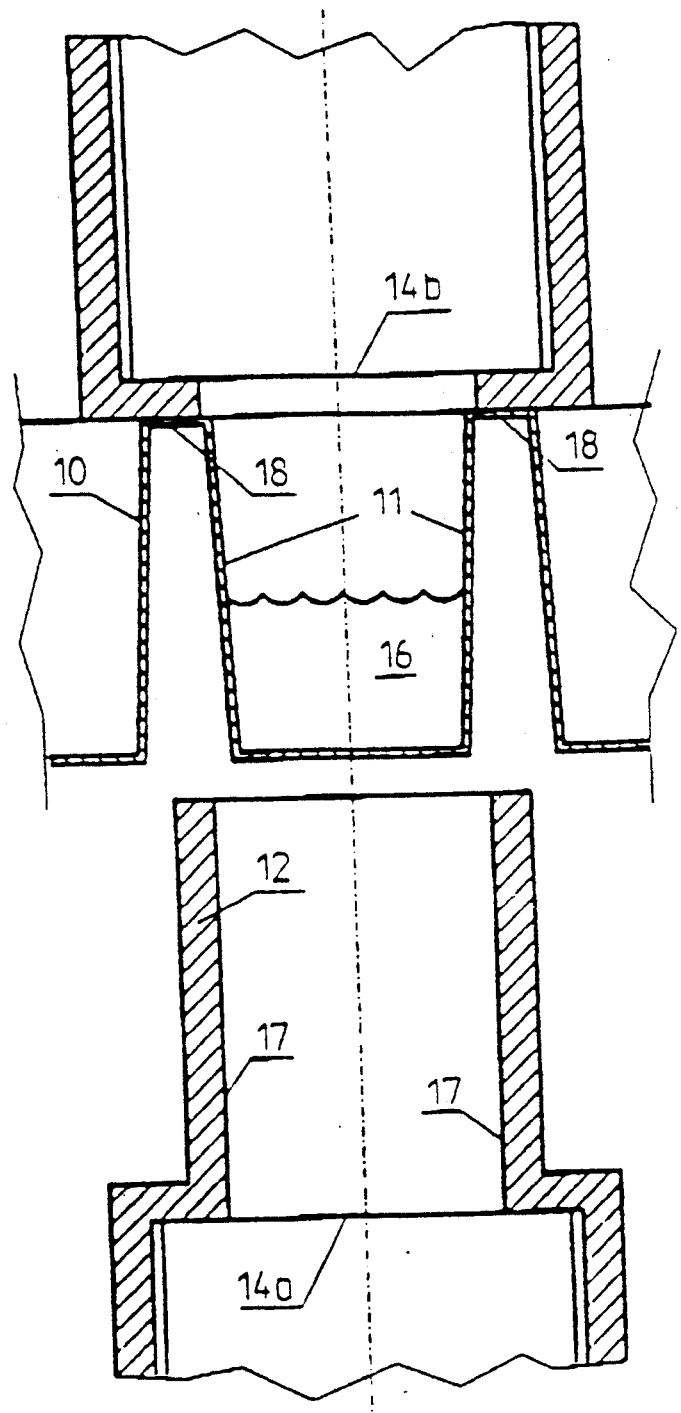

In FIG. 1a a sample plate (10), which has several sample wells (11) is placed manually or automatically in a position where a liquid scintillation sample (16), which is in the sample well (11), can be counted. In order to count one or several samples (16), which are in said sample wells (11), at a time, the apparatus has one or several detectors that consists of two photomultiplier tube assemblies (14a, 14b) which work in coincidence and are situated on the top and bottom of said sample plate (10).

The lower photomultiplier tube assembly (14a) is provided with a tube (12). The inner diameter of this tube (12) is equal to or larger than the maximum outer diameter of the sample wells (11).

The apparatus has a moving mechanism, which is not shown here, by which said lower photomultiplier tube assembly (14a) provided with said tube (12) can be moved to up or down positions.

In FIG. 1a said lower photomultiplier tube assembly (14a) provided with said tube (12) is in the down position in order to allow free horizontal movement of said sample plate (10). In FIG. 1b said lower photomultiplier tube assembly (14a) provided with said tube (12) has been lifted to the up position tightly against said upper photomultiplier tube assembly (14b) in order to form an optically closed compartment around said sample well (11) of the sample plate (10).

In order to guide the light from the liquid scintillation samples (16) located in said sample wells (11) to said photomultiplier tubes (14a, 14b), the inner surfaces (17) of said tube (12) reflects or scatters light.

In order to prevent light from travelling between the sample wells (11) inside the material of the sample plate (10), cne or both of the surfaces (18) between the wells (11) of the sample plate (10) are painted black or this region (18) is treated in some other way which prevents light from travelling between the sample wells (11) inside the material of the sample plate (10).

The invention is not confined to the above embodiments alone, but it may show even considerable variation within the scope of the patent claims.

What is claimed is:

1. An apparatus for counting liquid scintillation samples which comprises
    a sample plate (10) that contains a plurality of sample wells (11),
    each sample well (11) comprising means for containing a scintillation sample and being in the form of a cup having an open top, a closed bottom and side walls extending upwardly from said closed bottom to said open top,
    a first photomultiplier tube assembly (14b) that is positionable immediately above the open top of a first sample well (11),
    a second photomultiplier assembly (14a) that works in coincidence with said first photomultiplier assembly (14b) and which is positionable beneath the closed bottom of said first sample well (11),
    a tubular member (12)
    (a) extending upwardly from said second photomultiplier assembly (14a),
    (b) having an internal diameter approximating the maximum external diameter of said first sample well (11),
    (c) completely surrounding the side walls of said first sample well (11), and
    (d) having an inner surface (17) that reflects or scatters light so as to guide the light from a liquid scintillation sample that is placed in said first sample well (11) to said photomultiplier tube assemblies.

2. Apparatus according to claim 1 wherein the surfaces of said sample plate that extends between said sample wells are treated to prevent light from travelling between said sample wells via the material of said sample plate.

* * * * *